United States Patent
Wang et al.

(10) Patent No.: US 8,071,190 B2
(45) Date of Patent: Dec. 6, 2011

(54) TIRE FORMER BLADDER AND METHOD FOR MAKING SAME

(75) Inventors: Hao Wang, Carmel, IN (US); Jason Smith, Avon, IN (US); John D. Rensel, Tallmadge, OH (US); Michelle A. Correll, Gainesville, FL (US); Mark McEwen, Clinton, OH (US); James C. Updegraff, Noblesville, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 266 days.

(21) Appl. No.: 11/469,278

(22) Filed: Aug. 31, 2006

(65) Prior Publication Data

US 2008/0053621 A1    Mar. 6, 2008

(51) Int. Cl.
*B29D 22/00* (2006.01)
*B60C 5/00* (2006.01)

(52) U.S. Cl. .............. 428/36.1; 428/36.2; 428/36.8; 152/450

(58) Field of Classification Search .............. 428/36.1, 428/36.2, 36.8; 152/450
See application file for complete search history.

(56) References Cited

U.S. PATENT DOCUMENTS

| | | | | |
|---|---|---|---|---|
| 3,281,311 A | * | 10/1966 | Paul | 442/293 |
| 3,386,875 A | * | 6/1968 | Grote | 156/416 |
| 4,300,615 A | * | 11/1981 | Kavchok | 152/451 |
| 4,533,305 A | * | 8/1985 | Comper et al. | 425/43 |
| 5,260,123 A | * | 11/1993 | Hergenrother et al. | 442/183 |
| 2003/0122284 A1 | * | 7/2003 | Mori et al. | 264/501 |

OTHER PUBLICATIONS

Definition of Coextensive; Compact Oxford English Dictionary; http://www.askoxford.com/concise_oed/coextensive?view=uk; 2010.*

* cited by examiner

*Primary Examiner* — Rena L. Dye
*Assistant Examiner* — James Yager
(74) *Attorney, Agent, or Firm* — Jason A. Houser; Arthur M. Reginelli

(57) ABSTRACT

A multi layered tire former bladder and a method for making the bladder is described. The multi layered bladder includes a elastomeric bladder having an outer surface and an inner surface; a release coating on the outer surface of the bladder; and at least two fabric reinforcing plies which include a first outer ply embedded in the bladder below the outer surface and an inner surface fabric ply at the inner surface of the bladder. In the method of making the bladder an air dried release coating is applied to the outer elastomeric surface of the bladder.

10 Claims, 1 Drawing Sheet

TIRE FORMER BLADDER AND METHOD FOR MAKING SAME

FIELD

The invention relates to tire former bladders and a method for making these bladders. More specifically, an elastomeric tire former bladder is described where the tire former bladder has a construction which includes at least two fabric reinforcing plies. A method is described where an air dried silicone release agent is applied to the outer surface of the bladder.

BACKGROUND

Tires are a combination of many different parts, some of which are rubber and some of which are fabric and/or steel. These parts come together at a tire assembly machine ("TAM"). The TAM is a large horizontal drum where a tire builder who operates the TAM will first slip bead subassemblies over the drum. Thereafter, an inner liner layer is created by wrapping multi-layers of elastomeric rubber onto the drum. The ends of the layers are spliced together to make what is a tube. A tire casing is built with the application of one or more body plies. At this point, the components of the tire more resemble a wheel than a tire and the casing has to be put into the shape and size of a tire. This is done with a rubber tire former bladder. This bladder acts like an inner tube and inflates inside the layers which form the tire casing. At the same time, the TAM drum, which is like a mandrel and over which the layers have been wrapped, shortens itself and pushes the outside edges of the various layers together.

The edges of the body plies of the casing also have to be folded over the tire beads to secure the beads to the casing. This folding is done by turn up bladders (TUBs), which turn the body plies over the bead(s) to secure the plies and casing to the beads. Thereafter, belts and treads are applied, the TAM spun and the various parts are pressed together to make a green tire which then is cured.

Tire former bladders are highly elastic and may be used to shape the uncured tire to place and stabilize plies and tread. These former bladders are subjected to multiple inflations and deflations and have fairly large areas which must readily release from the inner liner of the tire so that the former bladder may be used with another tire forming in another cycle of tire making. In this respect, tire former bladders are unique and different from turn up bladders. The inflations and deflations of tire former bladders cause abrasion on the internal surface of the bladder as it deflates and the internal surface of the bladder folds onto itself. In the past, this rubbing has caused abrading the internal surface of the bladder. Hence the tire former bladder not only must be strong, but ideally should be abrasion resistant to withstand thousands of duty cycles under dynamic high strain conditions, yet the tire former bladder also must readily release from large areas of the uncured tire when deflated. In contrast, turn up bladders do not experience strain and wear from having large areas having to release from green tires. Tire former bladders in the past have readily stuck to green tires disrupting production and the cycle life of the tire former bladder.

U.S. Pat. No. 5,188,904 to Graves describes TAMs and the use of bladders, most specifically mentioning turn up bladders (TUBs), which have a release agent on the outer surface of that elastomeric bladder. Graves has considerable detail as to the use and composition of the release agent on the exterior surface of the TUB. Graves also mentions that the TUBs have an optional fabric reinforcement, but does not discuss the problem of abrasion of the inner surface of tire former bladders, how much stretch the fabric has or should have and where the fabric reinforcements are made a part of the TUB. Indeed tire former bladders need to be capable of more stretch than typical TUBs because tire former bladders do stretch more, and silicone release agents do not adhere well to the outer surface of the former bladder.

Fabric reinforcing agents also are known in tire former bladders. These fabric reinforcing agents, however, were on the inside and/or outside surface of elastomer bladder and did not address an abrasion problem together with a problem concerning the release of the outer surface of the former bladder from the green tire as the bladder as the bladder went through multiple work cycles in forming tires. Known fabric reinforcing agents on the inside surface of the former bladder did not address the ability of the reinforcing agent or fabric to adhere to the bladder, yet reduce friction at the inner surface of the bladder as it is inflated and deflated. Bladders with reinforcing agents on their outside surface did not address or solve the releasability of the bladder's outside surface from the inner liner of the tire being formed.

SUMMARY

A tire former bladder and a method for making such bladder are described where the bladder provides improved abrasion resistance, improved release properties for the former bladder from the tire and also has an increased cycle life. The structure of the bladder, the fabric reinforcement layers of the bladder, the embedding of at least one of the fabric reinforcement layers in the bladder at the inside surface of the bladder and the release coating on the outer elastomeric surface of the bladder provide the former bladder described herein with its unique advantages which include enhanced uniform release properties, enhanced abrasion resistance and an improved cycle life.

The structure of the bladder is in layers. In one aspect, the outer layer of the bladder is a silicone surface release coating which is on a primed bladder elastomer surface. A ply of a coated highly elastic fabric reinforcement forming an outer fabric ply is embedded in the elastomer bladder below the outer surface with the release coating. This outer reinforcing ply is entirely within the elastomer bladder. A second inner highly elastic fabric reinforcing ply is embedded in the elastomer at the inner surface of the bladder and forms the inner surface of the bladder. This inner ply can slide on itself when the bladder inflates and deflates on the tire forming machine and protects the bladder from wear by virtue of the action of the machine. The inner ply provides a low coefficient of friction against itself so that if the bladder doubles over itself, as is common, it can recover more easily and without wear.

The elastomer in the bladder is a black rubber compound (a natural rubber filled with carbon black) such as a high elongation rubber compound which has an elasticity such that it stretches at least about 300% or more of its size at rest, and preferably 500% to 600%, and then returns to its original shape and size. The elastomer has the ability to stretch in all directions in a plane.

The elastic fabric reinforcement plies in the bladder are polyurethane such as a Lycra type fabric, or polyurethane and polyamide (Nylon) blends. The fabric plies stretch in at least two, and preferably four, directions and should have a stretch equal to or less than the rubber compound. This means that the fabric should stretch up to at least about 200%, and preferably 300, and most preferably 500% to 600% of their size at rest with a recovery to their original size and shape.

In another aspect the multi layered tire former bladder described herein has an improved cycle life over known former bladders. The improved multilayer tire former bladder includes a bladder comprising an elastomer, the bladder having an outer surface and an inner surface; a release coating on the outer surface of the bladder; and at least two fabric reinforcing plies which include a first outer ply embedded in the bladder below the outer surface and an inner surface fabric ply at the inner surface of the bladder. This tire former bladder has an increased cycle life of at least 30% over bladders made with the same elastomer, the same inner surface fabric ply in the same position, no outer surface release coating, and with the outer surface fabric ply.

In yet another aspect, a tire former bladder and a method for making a tire former bladder are provided where the outer surface of the bladder has an air dried silicone release coating. In this aspect, multi-layered tire former bladder includes an elastomer bladder which made from a rubber compound as described above, the elastomeric bladder having an outer surface of rubber compound and an inner surface. The outer surface of the bladder has an air dried release coating layer comprising an air dried silicone composition. In this aspect, there is at least a fabric reinforcing ply layer as described above embedded in the bladder between the outer surface of the bladder and the inner surface of the bladder such that the reinforcing ply is below the outer rubber surface of the bladder and below the inner surface of the bladder.

Generally the bladders are built on a drum with the fabric plies and then cured in an autoclave as will be described herein.

In the method an air dried silicon release coating is applied to the primed outer surface of the elastomer of the former bladder. In a particularly important aspect, the release coating is applied as a blend of materials which includes a silane, such as vinyl tri(methyl-ethyl ketoxime) silane, a silicone and a catalyst in a solvent of heptane, or toluol or a blend of heptane and toluol.

DETAILED DESCRIPTION

Figure 1:
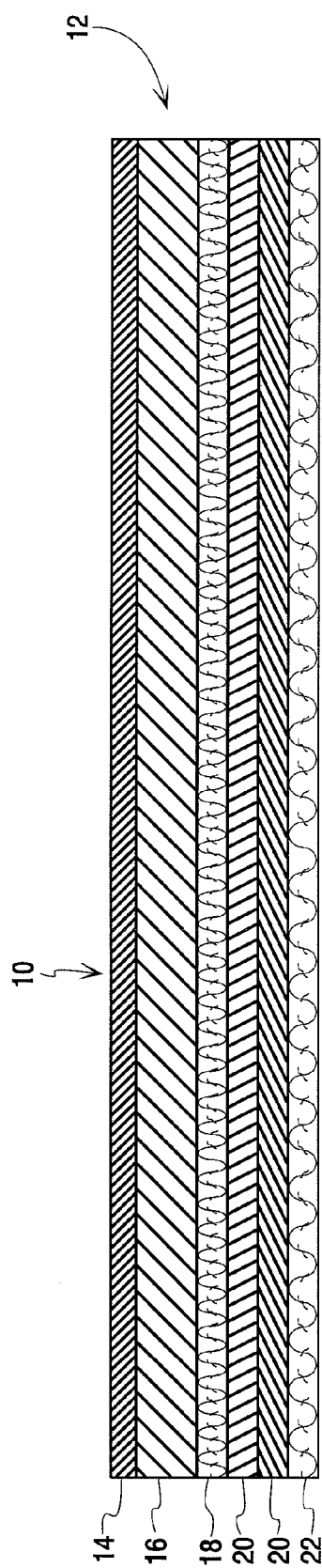
FIG. 1 is a cross section view of the tire former bladder.

As seen in FIG. 1 the tire former bladder 10 includes an elastomeric body 12 with an outer silicone release coating layer 14, an outer elastomer layer 16, an outer embedded fabric layer 18 one or more inner elastomer layers 20 and an inner fabric layer 22. The inner fabric layer is at the inner surface of the bladder. A rubber adhesive is used is used to adhesively affix the inner fabric layer to the inner elastomeric rubber surface of the bladder. A useful rubber cement is a blend of rubber, petroleum hydrocarbons including a solvent blend which includes two or more of the solvents of toluene, n-hexane, heptane, isopropyl alcohol and naphtha. A rubber adhesive commercially available as J5529 from Bridgestone/Firestone, Inc., Nashville, Tenn. is particularly useful. The inner fabric layer is at the surface of the elastomer and has a weave that restricts or inhibits the elastomer from working its way through the fabric and creating a surface with a high coefficient of friction. The inner fabric layer forms a surface which is resistant to abrasion and protects the elastomer from wear and abrasion as the bladder collapses onto itself and/or rolls over itself as the bladder inflates and deflates on the tire assembly machine. The inner fabric reinforcing ply has a weave which permits the elastomer of the bladder to penetrate the fabric where at least 30% of the area of the fabric is exposed to permit the surface of the fabric at the inner surface of the bladder to move across itself as the former bladder is inflated and deflated.

Both the inner fabric layer 22 and the embedded fabric layer 18 are made from an extensible fabric, such as a tricot knitted elastic weave. A fabric designated as Milliken 2700-D022, commercially available from Milliken Europe n.v., Ghent, Belgium is suitable. In an important aspect, the fabric is at least two way stretchable, preferably four way stretchable, to at least about 200% of the fabric not under tension with the fabric having the ability to return to its original size and shape when the tension is released. While the inner fabric layer forms an inner liner for the inner surface of the bladder, the embedded outer fabric layer is embedded in the elastomer between the outer elastomer layer 16 and the inner elastomer layers 20. The elastic fabric reinforcement plies may be polyurethane or blends of polyurethane and polyamides, such as Nylon. The fabric may be a Lycra type fabric. The fabric has a weight of at least about 200 $g/m^2$ and preferably from about 235 $g/m^2$ to about 270 $g/m^2$, and an average gauge of at least about 0.55 mm, and preferably 0.6 mm to 0.8 mm. The fabric ply stretches in at least two directions, and preferably four, up to at least about 200%, and preferably 300%, and most preferably 500% to 600% of its size at rest with a recovery to its original size and shape. The yarn structure or linear mass density of the fibers of the fabric may run from 5 to 50 Dtex (Milliken's 2700-D022 runs from 6 to 44 Dtex). The fabric for both the fabric embedded in the elastomer of the bladder and the fabric at the inner surface of the bladder should be coated or dipped with a material which facilitates adhesion and compatability of the fabric ply with the elastomer rubber. These fabric coatings are known. The amount and type of coating material for the fabric will vary depending upon the fabric and elastomer you are attaching the fabric to. For a polyurethane fabric a resorcinol formaldehyde latex coating is particularly appropriate. The latex can be a terpolymer based on styrene, butadiene and vinyl pyridine. The fabric is coated such as by dipping with the resorcinol formaldehyde latex fabric coating (85% fabric and 15% coating). Other coating materials, such as if the rubber is a EPDM (ethylene-propylene-diene) rubber, can include latexes which include hydrogenated styrene-butadiene rubber, carboxylated hydrogenated styrene-butadiene rubber, hydrogenated nitrile butadiene rubber and others as generally described in U.S. Pat. No. 6,860,962 to Pelton which is incorporated herein by reference. The amount and type of coating should be effective for permitting the fabric to be compatible with and adhere to the elastomer used to construct the bladder.

The elastomer used to make the outer elastomer layer 16 and the inner elastomer layers 20 of the bladder includes black rubber compound (a natural rubber filled with from about 20 to about 25 weight percent carbon black having an average particle size in the range of from 20 to 25 microns. Typical elastomers include those made from conjugated dienes, such dienes generally having 4 to 8, and preferably from 4 to 6, carbon atoms, with specific examples including butadiene and isoprene. Both natural rubber and synthetic rubber may be used. Elastomeric substrates can be various copolymers made from a conjugated diene monomer such as those mentioned above and a vinyl substituted aromatic having from 8 to 12, and preferably from 8 to 10 carbon atoms, such as styrene and alpha-methyl styrene. Natural rubber is a preferred elastomer.

The former bladder is made by the application of elastomeric and fabric plies over an appropriately sized mandrel or drum. After the layers of elastomer and fabric have been wrapped around the drum and the bladder has formed the layered components, the fabric and rubber components are prepared for curing which can be while the components are on the drum. Alternatively the components may be put into a mold. Either way the components are cured in an autoclave at times and temperatures which are known. Thereafter the cured components are removed from the autoclave and cooled. Excess material then is trimmed from the cured part.

The outer surface of the bladder has to readily release from the inner surface of the green tire. To accomplish this a release agent is applied to applied to a primed layer on the outer surface of the bladder. The surface of the elastomer is first subjected to buffing with a sander, then washed with a solvent such as acetone. Then the washed outer surface of the bladder is subjected to a treating agent such as halo cyclic amide in ethyl acetate, such as Chemlok 7701 commercially available from from Lord Chemical, Lord Corporation, 111 Lord Drive, Cary, N.C., USA. Thereafter the primer is applied to the treated surface of the elastomer. Primers which may be used include silicone rubber elastomer adhesives which may be one or more organic silane in an solvent such as methanol (such as Chemlok 607 also available from Lord Chemical, Lord Corporation, 111 Lord Drive, Cary, N.C., USA). The silicone release agent then is applied, such as by spraying, brush coating or roller painting, to the primed surface of the bladder. In an important aspect the release agent is air dried. This saves time and energy in producing the bladders. In this connection the air dried release coating may be a mixture of materials such as vinyl tri(methyl-ethyl ketoxime) silicone (commercially available as PRX 306 from Dow Corning Toray Silicone Co., Ltd., Tokyo, Japan) and a silicone with a catalyst (commercially available as SE 9500 WV83VB from Dow Corning Toray Silicone Co., Ltd., Tokyo, Japan). Other release coatings which may be used include Silastic Liquid Silicon (SLR) from Dow Corning and Silquest from GE Advanced Materials. After the release coating is applied, the release coated bladder is air dried for at least one day, preferably for about three days.

What is claimed is:

1. A multi-layered tire former bladder comprising:
   (i) an outer elastomeric layer;
   (ii) an embedded fabric layer adjacent to the outer elastomeric layer;
   (iii) an inner elastomeric portion, which includes one or more elastomeric layers, adjacent to the embedded fabric opposite the outer elastomeric layer;
   (iv) an inner fabric layer adjacent to the inner elastomeric portion opposite the embedded fabric, wherein the inner fabric layer comprises a fabric selected from the group consisting of polyurethane fabric and a fabric which is a blend of polyurethane and polyamide, the fabric being at least two way stretchable to at least about 200% of its size at rest; and
   (v) a release coating on the outer elastomeric layer opposite the embedded fabric, wherein said inner fabric layer forms the innermost layer of the tire former bladder, and wherein at least 30% of the area of the fabric of the inner fabric layer is exposed.

2. The tire former bladder of claim 1 wherein the bladder comprises an elastomer that is stretchable to at least about 300% of its size at rest.

3. The tire former bladder of claim 1 wherein the elastomer of the bladder is stretchable to at least about 300% of its size at rest.

4. The tire former bladder of claim 1 wherein the release coating is an air dried silicone release coating.

5. The tire former bladder of claim 1, where the inner fabric layer is adhesively affixed to the inner elastomeric portion.

6. The tire former bladder of claim 5, where the inner fabric layer is adhesively affixed to the inner elastomeric portion via a rubber cement.

7. The tire former bladder of claim 6, where the inner fabric layer is a woven fabric.

8. The tire former bladder of claim 7, where the embedded fabric is a woven fabric.

9. The tire former bladder of claim 1, wherein the polyurethane fabric is coated with a resorcinol formaldehyde latex coating.

10. The tire former bladder of claim 9, wherein the inner fabric layer comprises 85% fabric and 15% coating.

* * * * *